(12) United States Patent
Seligman et al.

(10) Patent No.: US 11,241,924 B2
(45) Date of Patent: Feb. 8, 2022

(54) TOWING ACCESSORY FOR TOW LIGHTS AND METHOD OF OPERATING

(71) Applicants: Dylan Seligman, Burnaby (CA); Leila Kennedy, Burnaby (CA)

(72) Inventors: Dylan Seligman, Burnaby (CA); Leila Kennedy, Burnaby (CA)

( * ) Notice: Subject to any disclaimer, the term of this patent is extended or adjusted under 35 U.S.C. 154(b) by 0 days.

(21) Appl. No.: 16/872,363

(22) Filed: May 11, 2020

(65) Prior Publication Data

US 2020/0391563 A1    Dec. 17, 2020

(30) Foreign Application Priority Data

May 10, 2019  (CA) ................. CA 3042937

(51) Int. Cl.
| | | |
|---|---|---|
| *B60D 1/58* | (2006.01) | |
| *B60Q 1/26* | (2006.01) | |
| *B60Q 1/30* | (2006.01) | |
| *B60Q 1/50* | (2006.01) | |

(52) U.S. Cl.
CPC .............. *B60D 1/58* (2013.01); *B60Q 1/2615* (2013.01); *B60Q 1/305* (2013.01); *B60Q 1/50* (2013.01)

(58) Field of Classification Search
CPC ........ B60D 1/58; B60Q 1/2615; B60Q 1/305; B60Q 1/50; B60Q 7/02
See application file for complete search history.

(56) References Cited

U.S. PATENT DOCUMENTS

| | | | |
|---|---|---|---|
| 2012/0287662 A1* | 11/2012 | Herberholt ............... | B60Q 1/52 362/542 |
| 2018/0043821 A1* | 2/2018 | Dixon .................... | G01R 31/44 |
| 2019/0093865 A1* | 3/2019 | Walser ................... | F21S 43/14 |
| 2019/0111832 A1* | 4/2019 | Schrag ................... | B60Q 1/50 |

* cited by examiner

*Primary Examiner* — Hongmin Fan

(57) ABSTRACT

Provided are a towing accessory for vehicles and method of operating them. The accessory comprises a mounting frame; suction cups, mounted to the frame in a spaced-apart arrangement; and a ferromagnetic attachment member attached to the frame at a side opposite the suction cups. Magnetic tow light system may thus attach to vehicles surfaces that are not magnetic via the accessory. The accessory has rotatable adjustments to enable the lights to face the required direction and mount to contours of the vehicle.

12 Claims, 5 Drawing Sheets

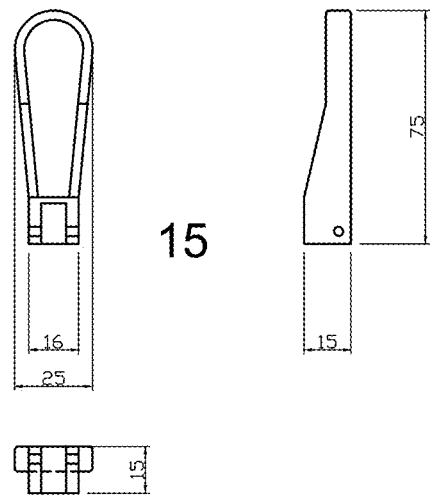
Fig. 5
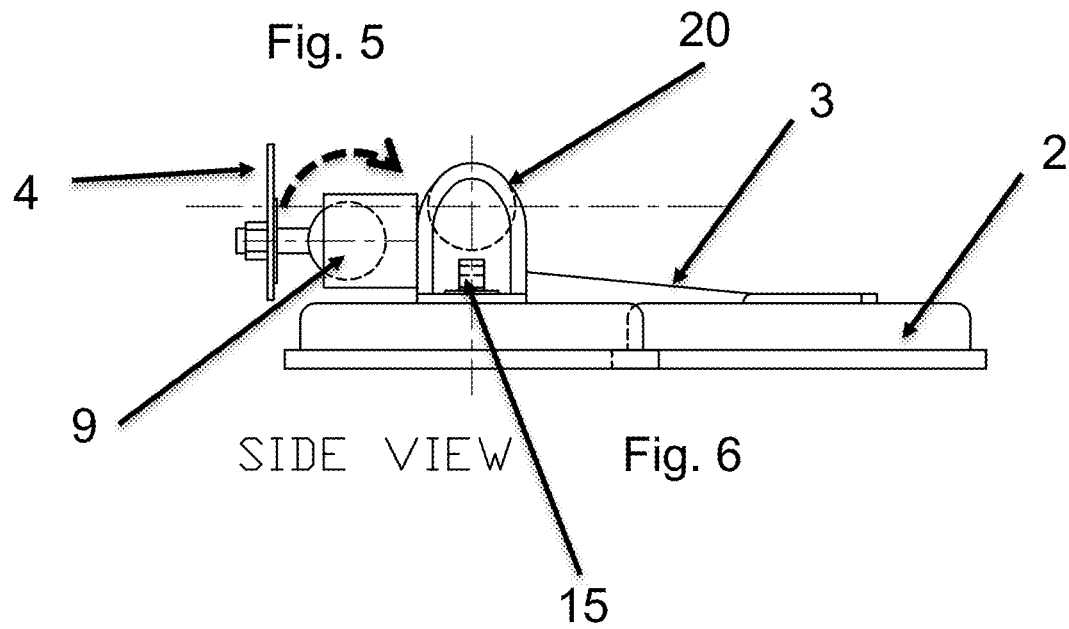
SIDE VIEW    Fig. 6

TOWING ACCESSORY FOR TOW LIGHTS AND METHOD OF OPERATING

FIELD OF INVENTION

The present application relates to accessories for towing vehicles, in particular to accessories for mounting tow lights to a vehicle body.

BACKGROUND

There is a growing number of vehicles made of non-ferrous materials, such as aluminum, plastic, and fiberglass. In the towing industry, tow lights must be mounted to the back vehicles, such as cars, trucks, RVs, and traders during a towing operation, for the sake of other motorists. These tow lights have left-turn, right-turn and brake lights linearly spaced-apart on a magnetic bar that would normally self-mount to a metal vehicle body and replicate the lights of a tow truck. The tow lights may communicate with the tow truck in a wired or wireless manner.

These alternative light-weight vehicle bodies leaves the towing industry with no way to legally secure or display directional changes and notice of braking to the cars behind. Thus tow operators resort to strapping the tow lights in any ad hoc way possible.

BRIEF DESCRIPTION OF THE DRAWINGS

Various objects, features and advantages of the invention will be apprarent from the following description and accompanying drawings.

FIG. 5 is a multi-view of a suction locking mechanism

FIG. 6 is a side view of accessory.

SUMMARY OF THE INVENTION

This invention provides an accessory and method for mounting tow lights to a vehicle on a variety of surface contours, while still directing the lights in the legally required way towards other motorists.

According to one aspect of the invention there is provided a towing accessory for vehicles comprising: a mounting frame; suction cups, mounted to the frame in a spaced-apart arrangement; and a ferromagnetic attachment member rotatably attached to the frame to permit adjustment of the attachment member to face a required direction.

According to a second aspect of the invention there is provided a method of operating a towing accessory for a vehicle. The method comprises: mounting a set of suction cups of the accessory to surfaces of the vehicle; mounting a set of tow lights to the towing accessory; adjusting the direction of the tow lights relative to the suction cups to face a required direction for towing; and communicatively coupling the tow lights to a tow vehicle.

Additional preferred features are set out in the dependent claims.

Description of the Invention

Figure 1:
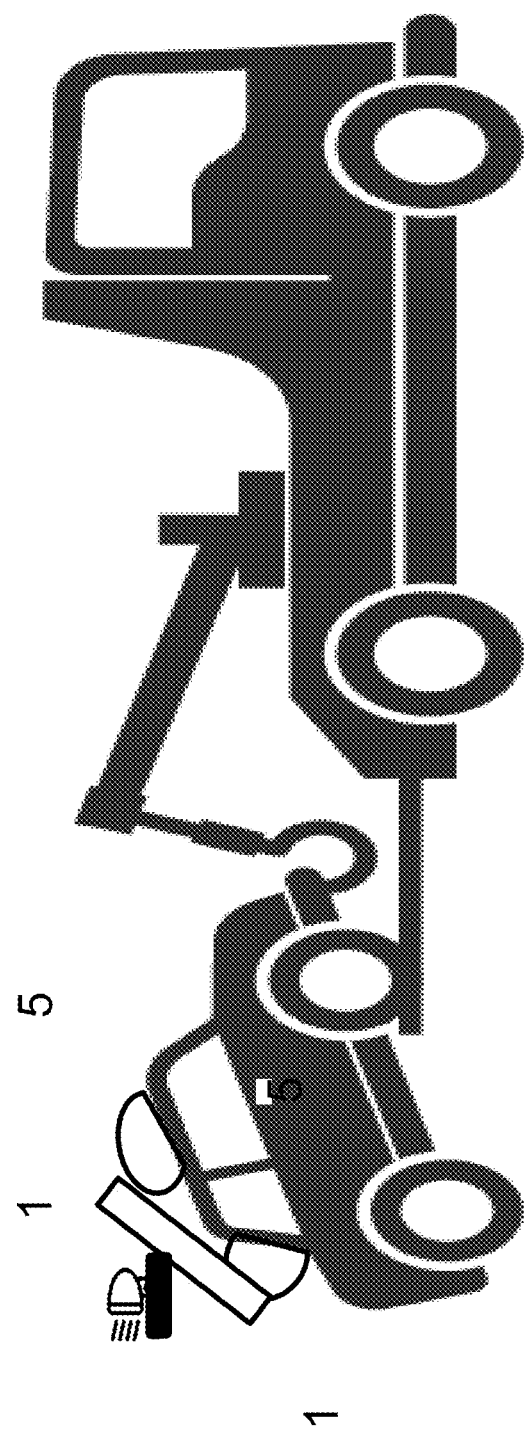
FIG. 1 is a side view of a towing accessory according to a preferred embodiment of the invention on a car being towed.

A towing accessory and method of using same are described with reference to the drawings. In particular, FIG. 1 shows a vehicle mounted with such a towing accessory and tow lights. The accessory 1 comprises suction cups 2, a mounting frame 3 and ferromagnetic attachment member 4. The suction cups enable the accessory to connect to the rear or front of a vehicle 5, such as on its glass window or body. Existing tow light bars 6 comprise magnets 7 that will self-mount to the attachment member 4. Mounting frame 3 interconnects the suction cups 2 to the attachment member 4. Rotatable mountings 9 enable the tow lights to be directed for optimal viewing by other motorists.

In use, the tow operator engages the suction cups onto flat surfaces of the car, although the surfaces need not be the same surface, continuous with each other or co-planar. The suction cups are then locked off to ensure the vacuum is maintained during a potentially bumpy ride. The tow light bars 6 are mounted to the attachment member 4 using the bar's magnets. The tow lights are then activated via the tow truck and the towing operating proceeds as usual.

Figure 2:
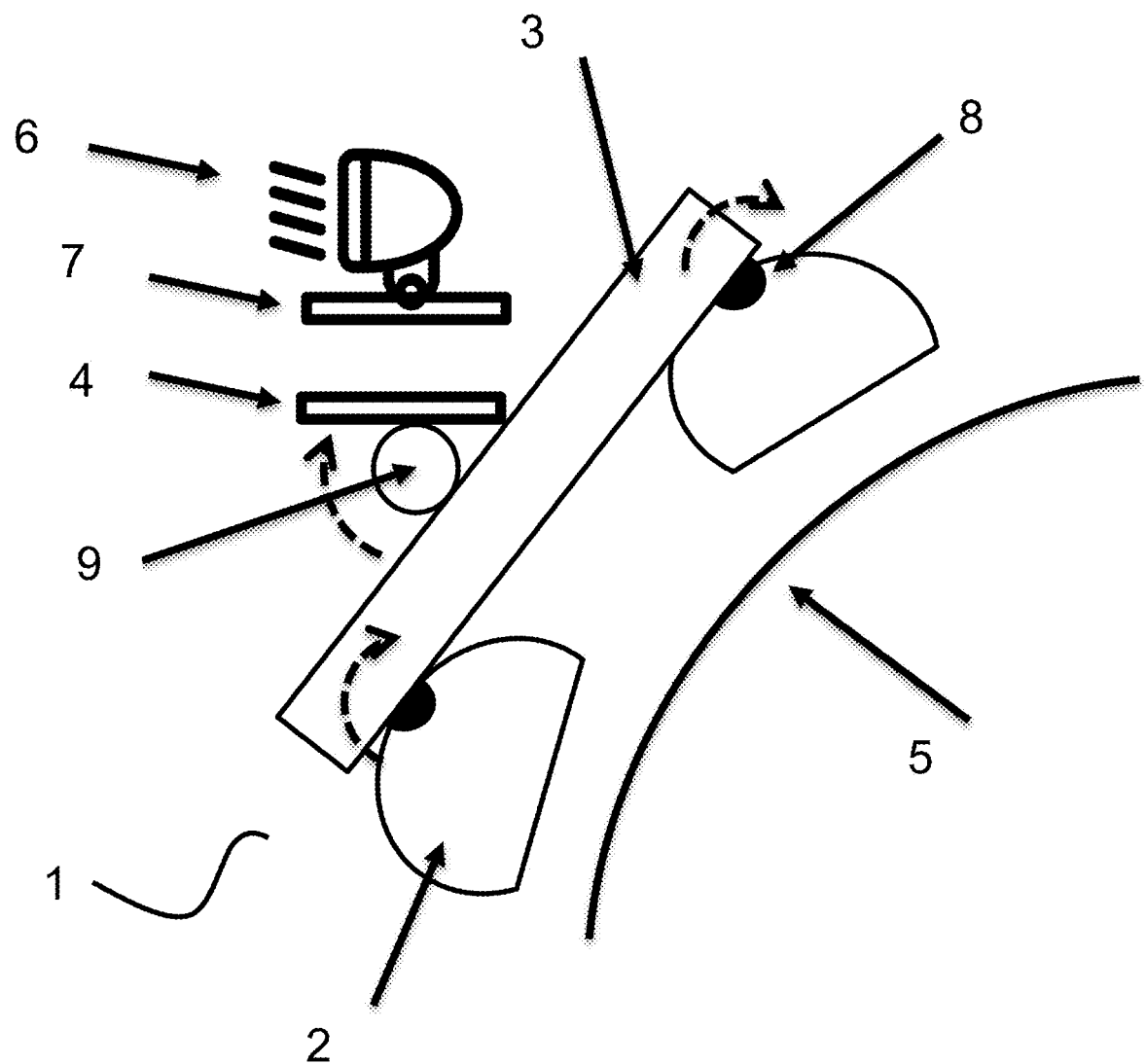
FIG. 2 is a side view of the towing accessory of FIG. 1, prior to mounting.
Figure 3:
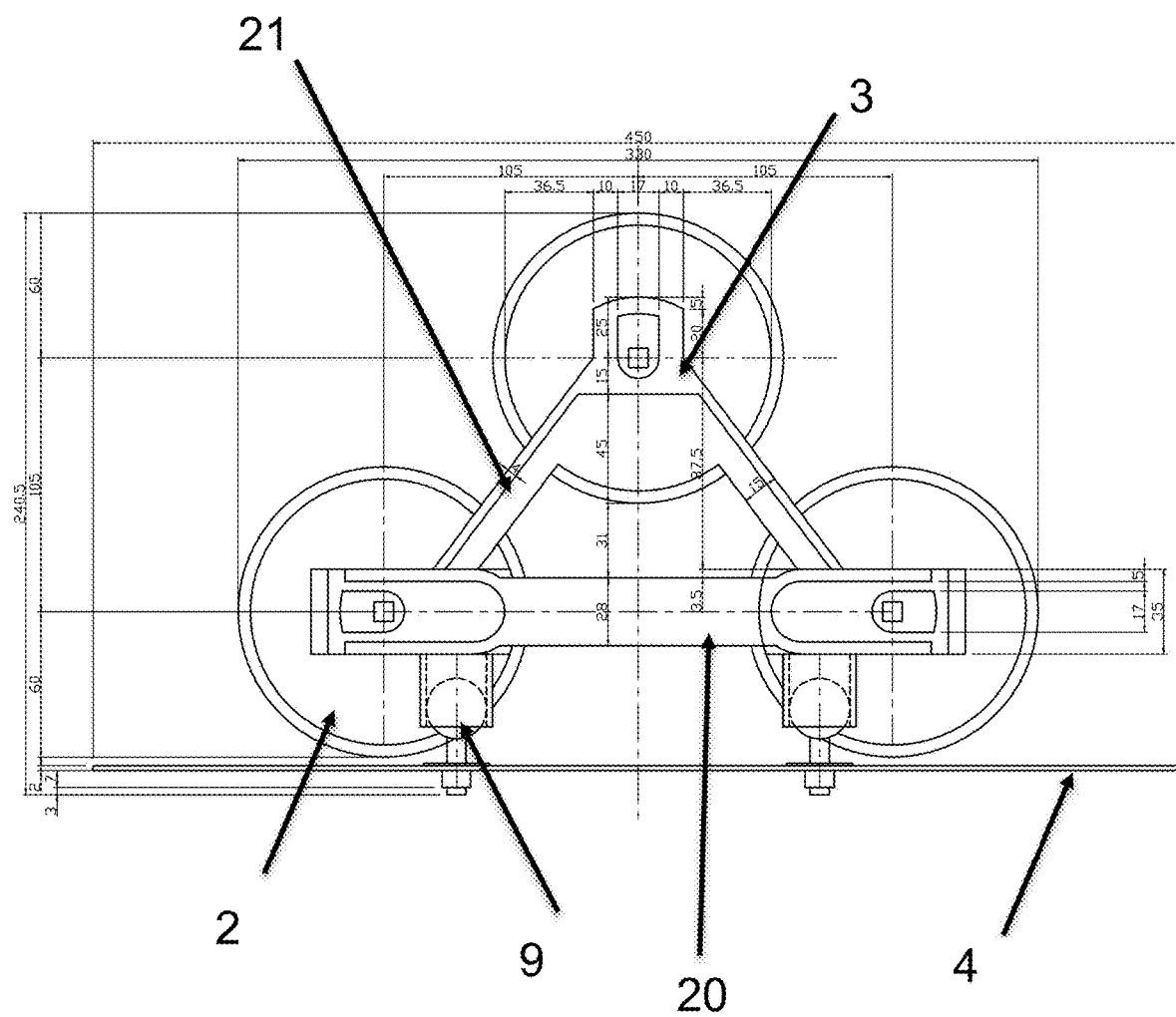
FIG. 3 is a plan view of the towing accessory.
Figure 4:
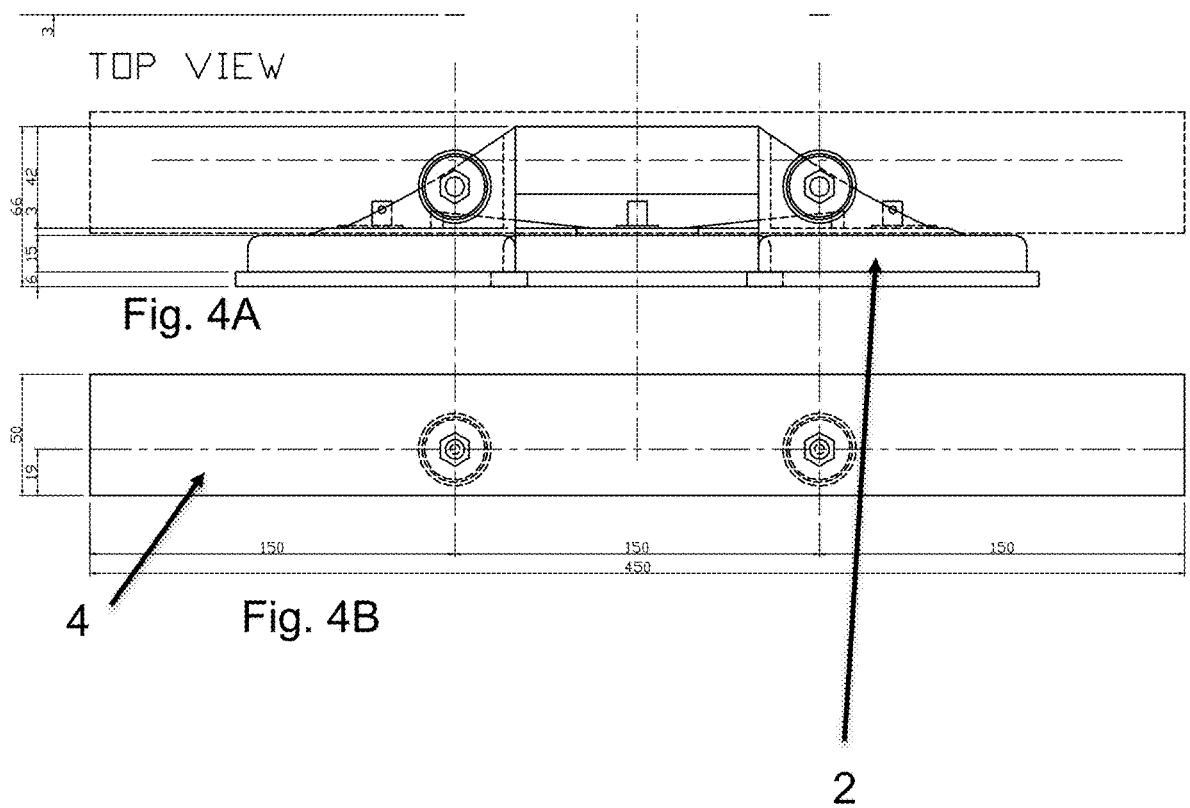
FIG. 4A is a top view of the accessory.
FIG. 4B is a front view of the accessory.

As shown in FIG. 2, the backs of the suction cups are mounted to the mounting frame in a spaced-apart arrangement. Here the cups are spaced-apart in two-dimensions (as opposed to simply linearly spaced) to provide lateral and vertical support to the tow light. The mounting location provide a triangular arrangement, preferably an equilateral or isosceles triangle. The spacing is preferably 20-60 cm. The suction cups 2 may be 3-5" diameter and made of a silicone compound. The mounting frame 3 may made of plastic or metal, preferably aluminum. The frame provides a structure for mounting the suction cups and keeping them spaced-apart, and is not limited to a particular shape connecting It will be appreciated that more suction cups than shown may be used for added strength but with added cost and hassle. For example, four suction cups may be spaced-apart in a rectangular or diamond mounted arrangement.

In certain embodiments, one or more of the suction cups are rotatably mounted to the frame, such as via swivels 8, hinges or a compliant mounting element. Thus the individual cups are rotatable with respect to each other in order to couple with surfaces of different orientations (i.e. surfaces that are not co-planar). For example, a curved glass provides two different planes, both of which are inclined relative to the vertical surface of the car body. Thus the rotatable mounting allows every suction cup to make a good seal. For similar reasons, the mounting frame should stand off from the suction side of the cups in their compressed state by a sufficient distance, so that the frame does not contact the vehicle where the contours change.

Alternatively the frame may have compliant portions 21 that allow the frame to flex. The suctions cups may thus be rigidly mounted to the frame but face differently oriented surfaces of the vehicles by bending the frame in the plane of the frame. The segments of the frame running between suction cup mounting locations may be flexible. The geometry of these portions may provide rigidity in other directions to prevent twisting, lateral flexing, and axial stretching.

The accessory may include handle 20 to facilitate operation during attachment and detachment. The handle may be connected to or integral with the mounting frame or the attachment member. The handle is preferably located away from the suction side and near the center of mass of the accessory.

The handle may be proximate or mechanically connected to the locking arms, such that when an upwards force is applied to the handle and arms, the arms unlock the suction cups and pull the whole accessory off the vehicle, in one motion. Conversely pressing the handle down towards the vehicle engages the locking arms to lock the cups in the compressed state.

As is well understood, suction cups provide adhesion to a flat surface by sealingly conforming to the surface in a compressed state. The resilience of the suction cups biases the cup to return to its cup shape (i.e. its uncompressed state), but doing so without breaking the seal creates a low pressure (e.g. a vacuum) inside the cup relative to the atmospheric pressure pressing the cup towards the surface. Due to aggressive movement during the towing operation, the suction cups might come unstuck. Thus in preferred embodiments, each suction cup is provided with a suction lock 15 that maintains the cups in their compressed state when the lock is engaged by the user. Such mechanisms are known and typically comprise a plate that presses the suctions cup in the compressed state, a locking cam, and arms that extend outwards and 'flip' the cam when moved by the user. In the present accessory, the locks' arms preferably extend towards the middle of the frame to avoid accidental unlocking by external objects.

The attachment member 4 provides a surface for either wired or wireless tow lights 6 to adhere to and spaced to the legal requirements for display. The entire attachment member or select portions are made of ferromagnetic material, such as iron or nickel. The attachment member may comprise a hot rolled steel flat bar 12-24" long 2" wide and 1\8" thick, where the dimensions relate to the size of the magnetic tow light and towing laws in each country. An 18" spacing will comply with CVSE and DOT legal requirements for tow light display. The member may be attached to the frame at a side opposite the suction cups mounting to the frame.

The inclinations of the windows and body panels of each vehicle 5 are different in every make and model of vehicle. The adjustment means may permit rotation of up to about 45 degrees, preferably up to about 90 degrees, to account for vehicle surfaces that may be inclined 45 or even 90 degrees from the required direction of the lights. The attachment member 4 further comprises one or more adjustable mounting means 9 that connect to the mounting frame. These means are preferably rotatable into plural fixable angles, which angles may be discrete or continuous. Thus the operator can adjust the light direction and have it remain in that direction. The angle may be fixed with detents, ratchet mechanisms, locking cams, pins, or other adjustable fixation solutions. The mounting means should be sufficiently secure and located at a sufficiently wide base on the frame to stably support the tow lights.

The skilled person will appreciate other attachment means are within the present scope. For example, the attachment member could be magnetic and the base of the tow lights could be magnetic or at least of a ferromagnetic material. In another alternative, the tow lights are secured via adhesive, clamps or fasteners to the attachment member.

In yet another embodiment, the attachment means comprises plural ferromagnetic blocks, each rotatably mounted to the frame and sufficiently spaced-apart to support the tow lights. Here the attachment member need not be a continuous bar, but simply provide locations where the tow light magnets can mount.

In any case, the rotatable adjustment means 9 couples the lights to the mounting frame to set the direction of the lights relative to the surfaces engaging the suction cups. The adjustment means may be two or more swivel balls with a locking means that engages against the ball into a fixed position.

The invention claimed is:

1. A towing accessory for vehicles comprising:
   a mounting frame;
   one or more suction cups mounted to the mounting frame;
   a ferromagnetic attachment member rotatably attached to the mounting frame and adapted to magnetically couple to a set of tow lights to permit adjustment of the tow lights to face a required direction.

2. The accessory of claim 1, further comprising locking mechanisms to lock the or each suction cup in a compressed state against a surface of the vehicle.

3. The accessory of claim 1, further comprising a handle connected to the mounting frame.

4. The accessory of claim 1, wherein the tow lights are rotatable by at least 45 degrees with respect to the frame.

5. The method of claim 1, further comprising means for fixing the tow lights at a plurality of fixed angles with respect to the frame.

6. The accessory of claim 1, wherein the suction cups comprise three or more suction cups, mounted to the frame in a spaced-apart arrangement.

7. The accessory of claim 6, wherein at least one of the cups is rotatably adjustable with respect to the other suction cups.

8. The accessory of claim 6, wherein the mounting frame comprises flexible links between suction cup mounting locations on the frame.

9. The accessory of claim 6, wherein the attachment member is attached to the frame at a substantially central location of the frame.

10. The accessory of claim 6, wherein the suction cups are three suction cups disposed in a triangular arrangement.

11. The accessory of claim 1, wherein the suction cups are four suction cups disposed in a diamond or rectangular arrangement.

12. The accessory of claim 1, wherein the attachment member has a length of between 12" and 24".

* * * * *